May 12, 1959  G. G. RESER ET AL  2,885,726
EXCORIATOR
Filed April 9, 1958  7 Sheets-Sheet 1
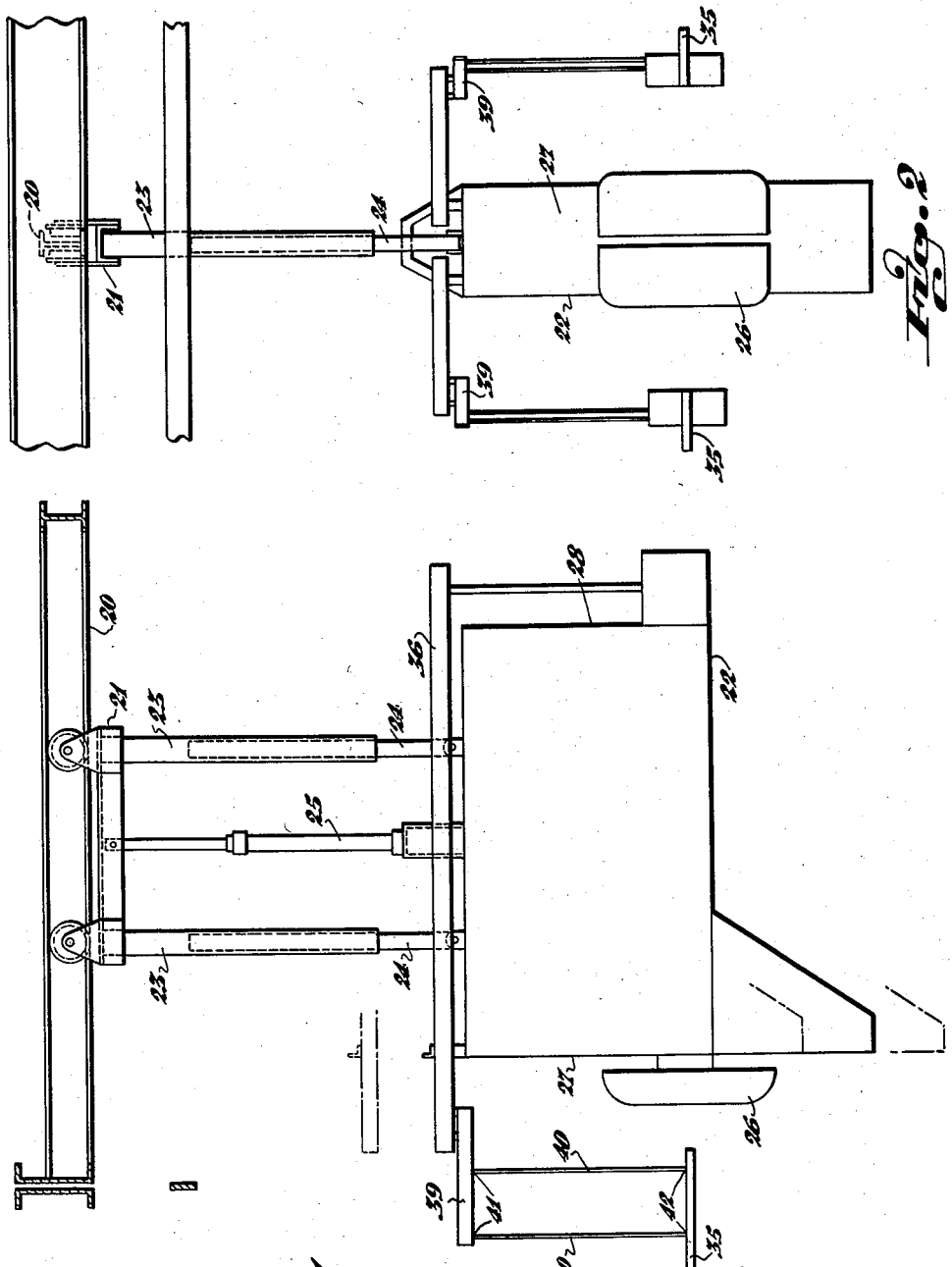
INVENTORS
GEORGE G. RESER
CLIFFORD J. PICKENS, SR.
BY CARL OSCAR SCHMIDT, JR.
ATTORNEY

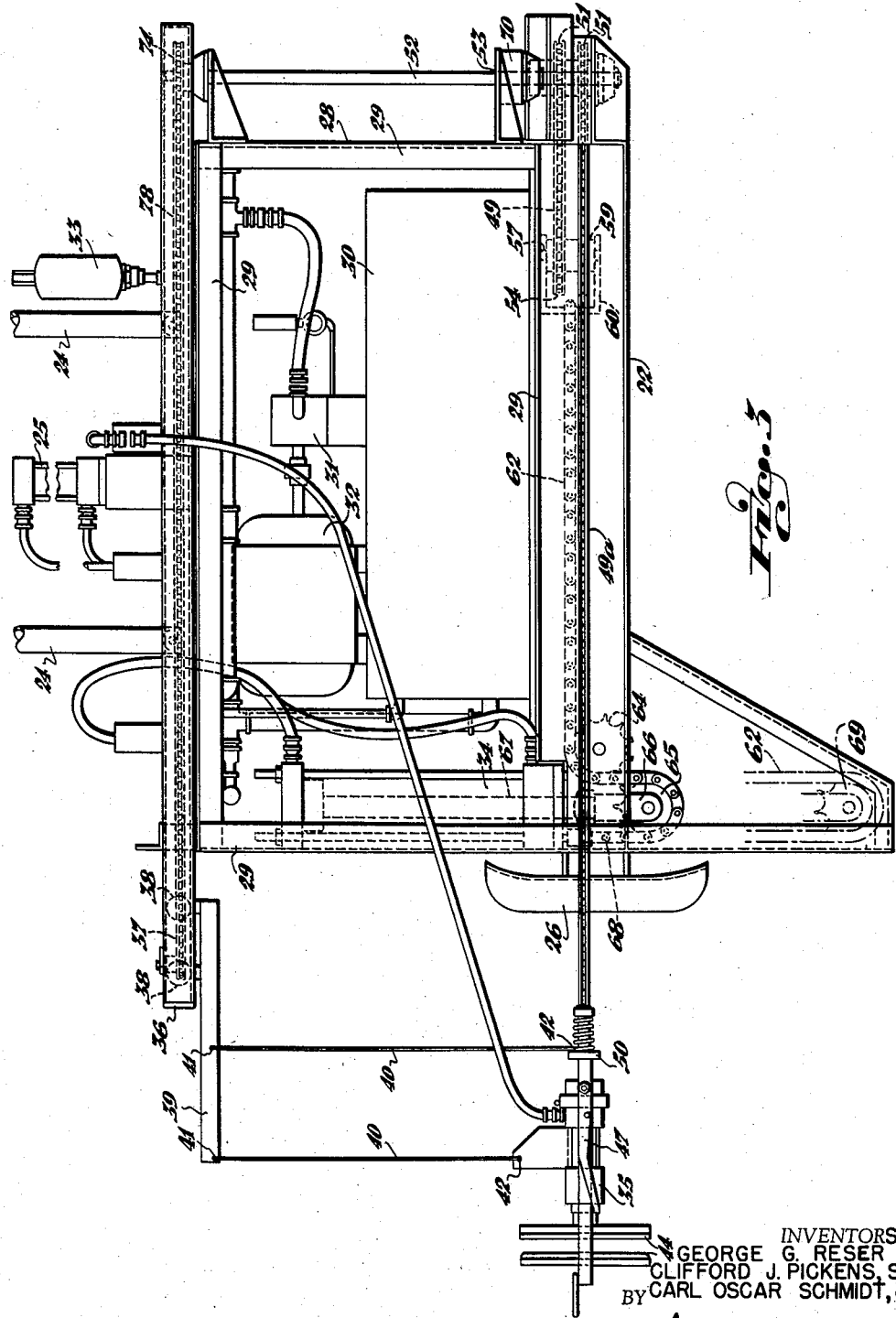

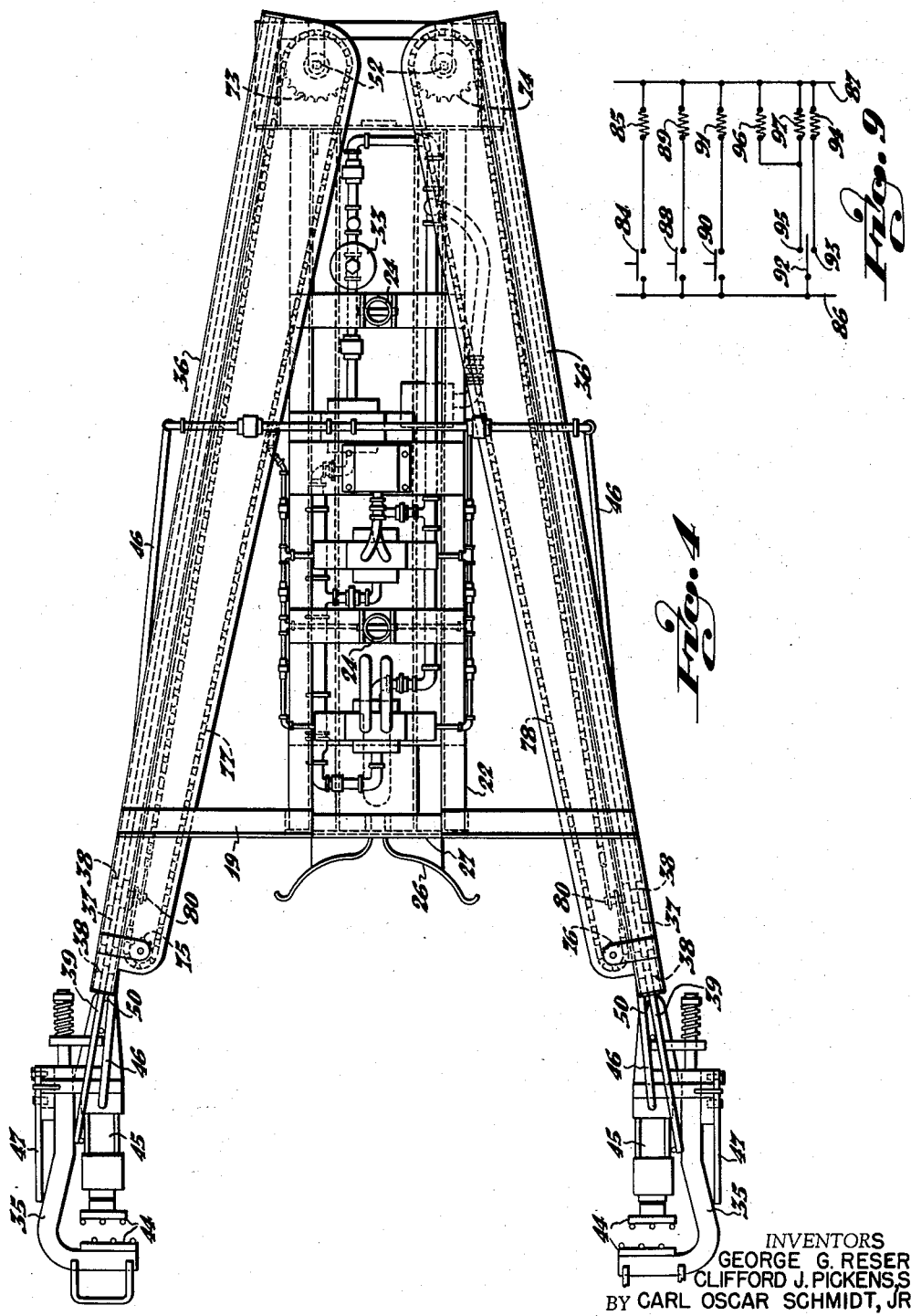

May 12, 1959
G. G. RESER ET AL
2,885,726
EXCORIATOR
Filed April 9, 1958
7 Sheets-Sheet 4
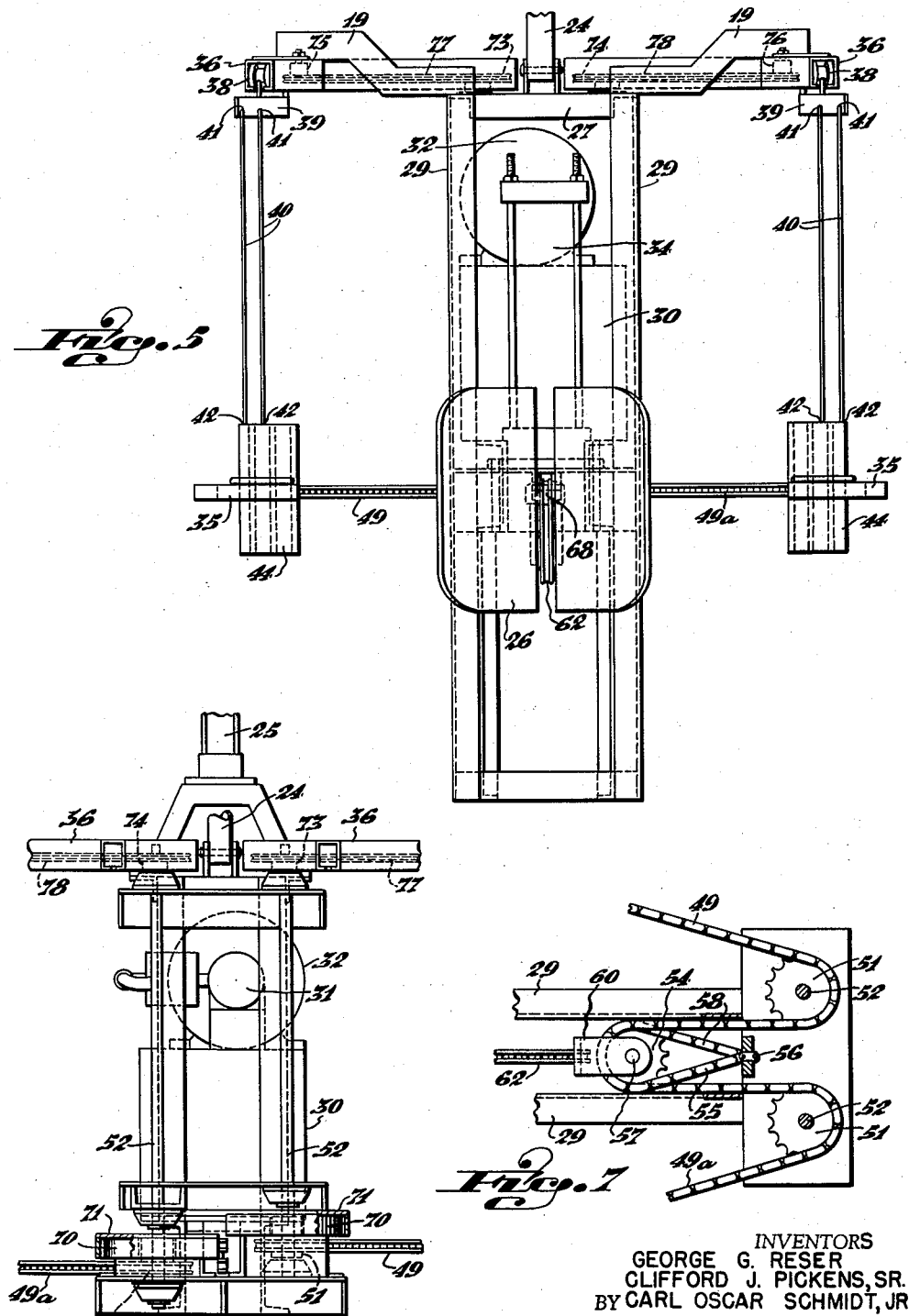
INVENTORS
GEORGE G. RESER
CLIFFORD J. PICKENS, SR.
BY CARL OSCAR SCHMIDT, JR.
ATTORNEY

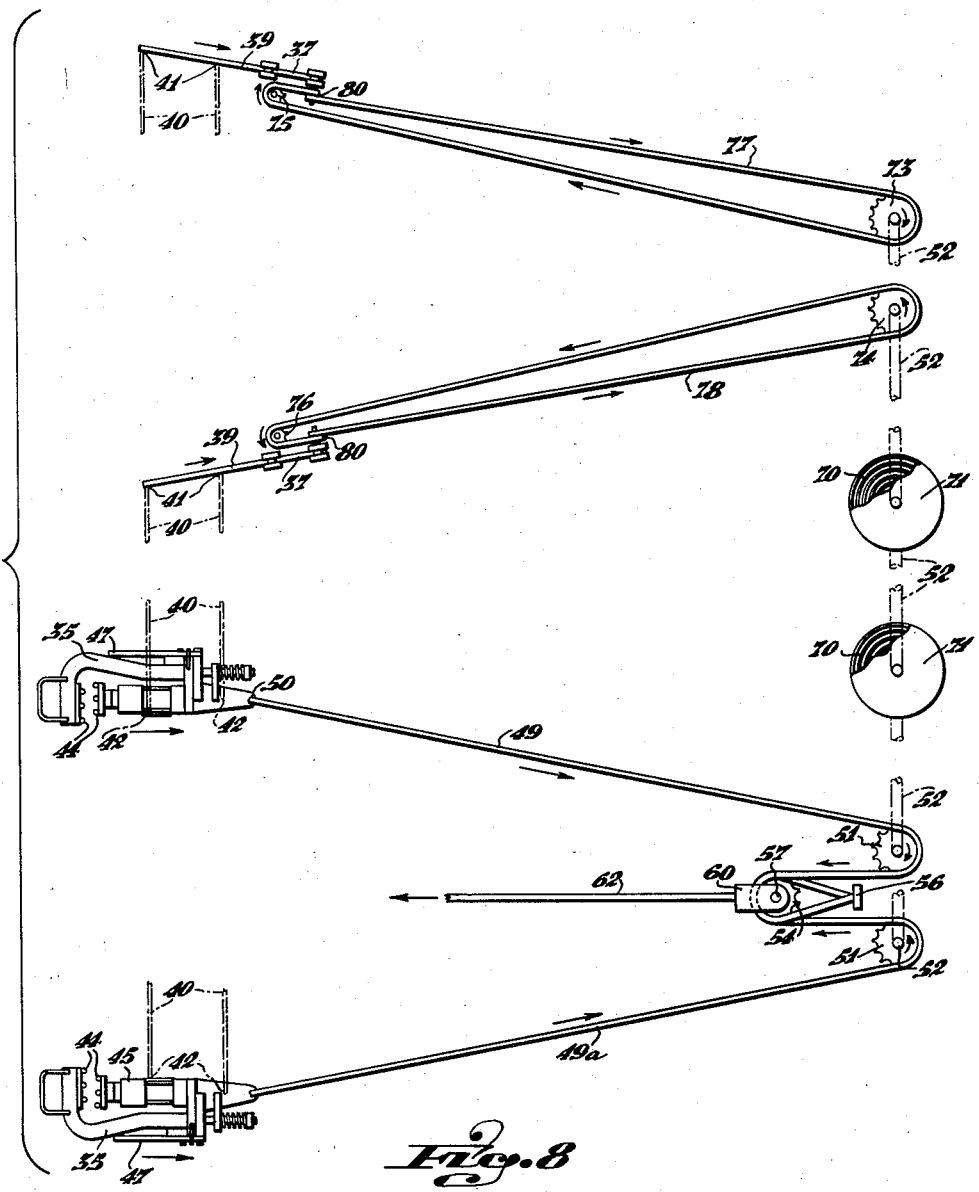

May 12, 1959 G. G. RESER ET AL 2,885,726
EXCORIATOR

Filed April 9, 1958 7 Sheets-Sheet 6

INVENTORS
GEORGE G. RESER
CLIFFORD J. PICKENS, SR.
BY CARL OSCAR SCHMIDT, JR.

J Warren Kinney Jr.
ATTORNEY

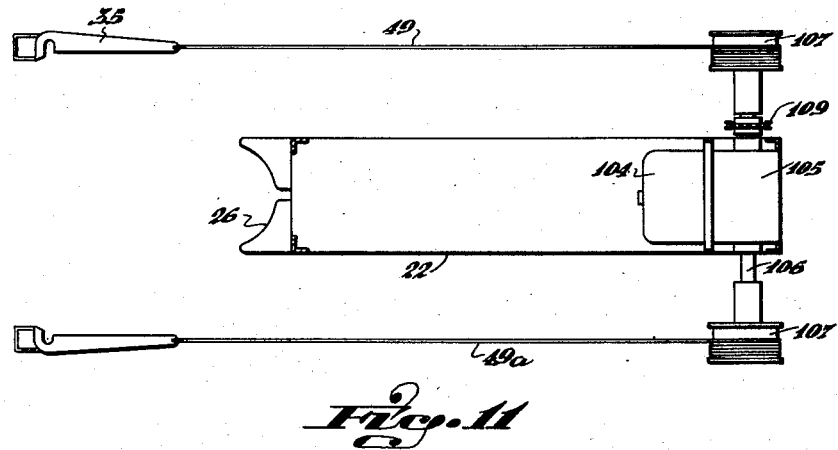
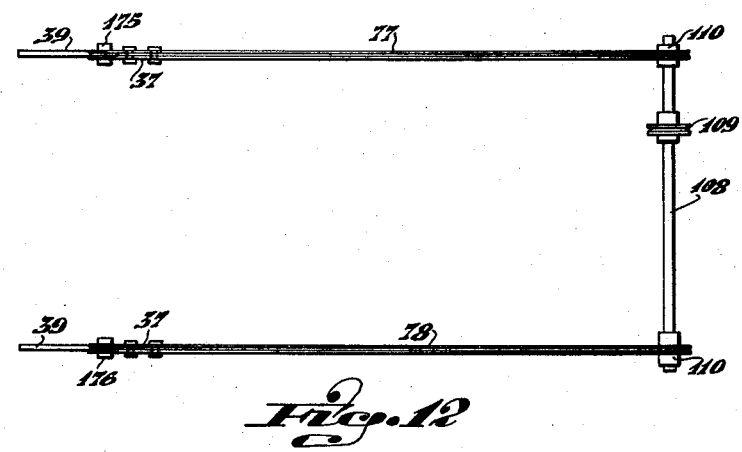

United States Patent Office 2,885,726
Patented May 12, 1959

2,885,726

EXCORIATOR

George G. Reser, Milford, Clifford J. Pickens, Sr., Cheviot, and Carl Oscar Schmidt, Jr., Wyoming, Ohio, assignors to The Cincinnati Butchers' Supply Company, Cincinnati, Ohio, a corporation of Ohio Application April 9, 1958, Serial No. 727,390

14 Claims. (Cl. 17—21)

This invention relates to an excoriator, the primary purpose of which is to strip the hide from meat animals.

An object of the invention is to provide improved means in an excoriator construction whereby the hides may be stripped from animals with extraordinary rapidity in a high production line or system, resulting in substantial savings of time, labor, and expense, while at the same time increasing the capacity of the system as a whole.

Another object is to so facilitate the operation of hide removal that the operator of the excoriator may work under improved conditions with substantial freedom from fatigue and tiring labor.

A further object of the invention is to provide means in an excoriator for obtaining a maximum range of hide pulling motion without undue increase in the size of the mechanism, thereby to conserve valuable floor space and minimize the motions required of the operator in the performance of his duties.

Another object is to provide for unrestrained self-adjustment of the hide grippers during and following application thereof to the hide, thereby to facilitate connection and disconnection, while at the same time ensuring hide removal without damage to the hide.

The foregoing and other objects are attained by the means described herein and illustrated upon the accompanying drawings in which:

Fig. 1 is a side elevational view of the improved excoriator, shown adjustably suspended from an overhead rail or track.

Fig. 2 is a front elevational view of the same.

Fig. 3 is a view similar to Fig. 1, showing the device on an enlarged scale and with certain covers removed to expose interior parts.

Fig. 4 is a top plan view of the excoriator as illustrated by Fig. 3.

Fig. 5 is a front elevational view taken from left to right upon Fig. 3, with certain upper parts omitted.

Fig. 6 is a rear elevation of the same, parts broken away.

Fig. 7 is an enlarged detailed plan view, parts broken away, showing a chain system for actuating the hide grippers.

Fig. 8 is a composite diagrammatic view illustrating the principle of operation of the means for advancing and retracting the hide grippers and their suspenders.

Fig. 9 is a diagram of electric control means for the various elements of the excoriator.

Fig. 11 is a cross-sectional view taken on line 11—11 of Fig. 10.

Fig. 12 is a cross-sectional view taken on line 12—12 of Fig. 10.

Figure 10:
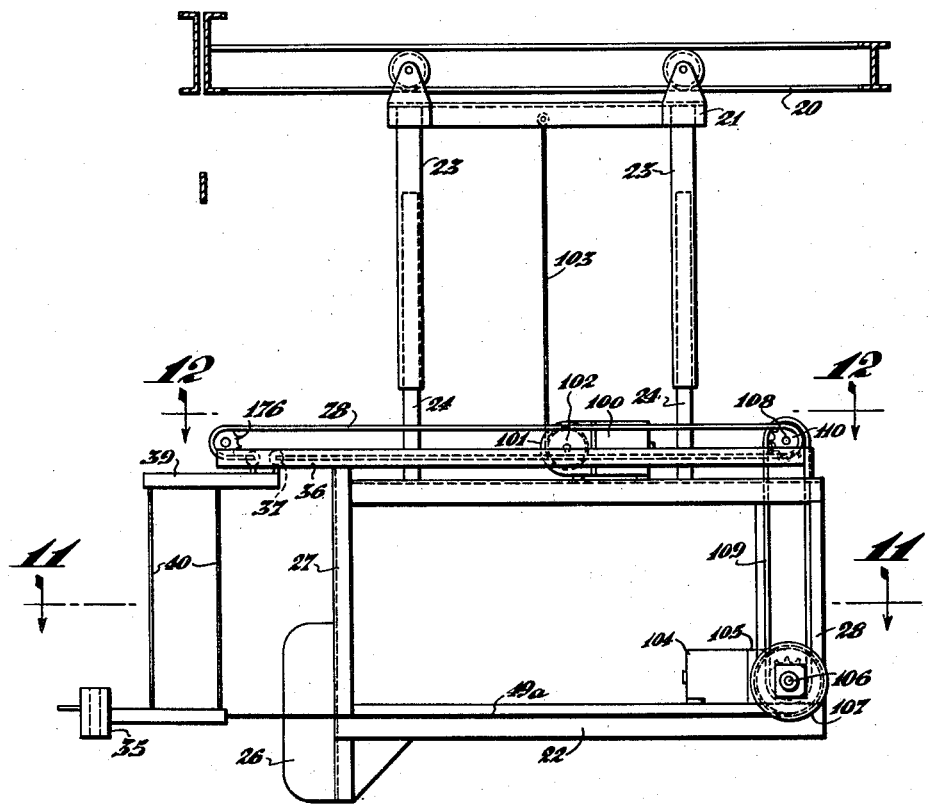
Fig. 10 is a side elevational view of a modified form of the excoriator.

In the commercial stripping of hides from animals, it is necessary that the operation be performed at a rapid rate but without damage to the hides and the carcasses from which the hides are taken. Usually, the carcasses are hung from a moving, or movable, overhead conveyor and transferred from one station to another at which various operations are performed upon the carcasses. Commercial success of the system involves continuity of movement to the greatest possible extent, and convenience of access and handling of the carcass with minimal fatigue to the operator. It is accordingly desirable that the excoriator be so constructed as to save steps on the part of the operator, and to eliminate unnecessary motions and heavy lifting. In most installations it is desirable also that valuable space be conserved by resort to compact mechanical construction.

The above requirements, among others, are attained by means of the improved excoriator construction herein disclosed, where Figs. 1 and 2 illustrate in side and end elevations a preferred embodiment of the invention. At 20 is shown an overhead stationary rail upon which may ride a trolley 21 including means to adjustably suspend the chassis 22 of the excoriator. The trolley may carry guide means in the form of telescopic tubes 23 and 24, and a power means 25 which may be in the form of an hydraulic cylinder or equivalent device whereby the chassis may be elevated and lowered relative to the rail 20, and relative to any carcass that may be presented to the back rest 26 fixed to the forward end 27 of the chassis. The back rest may be made concave as illustrated by Fig. 4, to substantially conform with the back of an animal presented thereto, so that the carcass will not roll sidewise during the hide stripping operation.

The chassis may be substantially elongate in form, presenting the forward end 27 of a rear end 28. Any suitable structural members such as angle irons 29 may be utilized in the assembly of the chassis, which is of rigid construction. Within the confines of the chassis may be mounted suitable power means for effecting the necessary operations of adjusting the elevation of the chassis, and actuating the hide grippers. In that form of the device illustrated by Figs. 1 to 9, the power means may be primarily hydraulic, involving the use of a fluid reservoir 30, a pump 31, an electric motor 32 driving the pump, an accumulator 33, and various conduits and valves for transmission and control of fluid under pressure needed for operating the mechanism of the excoriator. The character 34 indicates a main hydraulic cylinder for positively and forcefully retracting the hide grippers indicated generally by the character 35, in a manner to be explained.

At the top portion of the chassis is fixed a pair of elongate track members 36—36, such as, by way of example, channel stock, which extend generally lengthwise of the chassis. The track members may be divergent in the direction of the forward end of the chassis, to accommodate the width of a carcass resting against the back rest 26. It may be noted also that the forward ends of the track members project beyond the back rest and the front end of the chassis, by preference. Each track member 36 is adapted to support a carriage 37 which preferably is equipped with wheels 38, so that the carriages easily may be shifted along the length of their respective track members, from the initial forward position of Figs. 1, 3, and 4, to a retracted position near the rear end of chassis.

Each carriage 37 is provided with a forward extension or arm 39 rigidly mounted thereon, these extensions or arms being normally projected well in advance of the track members and the back rest 26, so as to dispose the suspended grippers 35 forwardly to a convenient position at which the grippers may be applied to a rimmed portion at each side of the animal carcass. The hide grippers are afforded universal movement in all lateral directions, by reason of the fact that each is suspended from a carriage extension 39 by means of one or more flexible suspenders 40, the opposite ends 41 and 42 of which are secured, respectively, to the carriage extensions 39 and to the hide grippers 35. The suspenders or suspension means 40 may be of flexible cable, chain, or similar stock which will afford the desired freedom of movement of the grippers in all lateral directions, whereby the operator with great ease and dispatch may position and actuate the grippers upon any carcass regardless of its width or length.

The hide grippers may be of any known construction or type, so far as the present invention is concerned but will preferably include gripping jaws 44 equipped with hydraulic cylinders 45 for opening and closing the jaws. The fluid pressure to and from the cylinders may be supplied by way of flexible hoses or conduits 46 (Fig. 3), and control for the cylinder and jaw movements may be had at a hand lever 47 mounted directly upon the gripper for maximum convenience of operation. This detail is of no material concern to the present invention, and is well known in the industry, so that further explanation appears superfluous. The flexible hose 46, of course, affords minimal interference with free suspension of the gripper.

As will be understood, it is necessary for the performance of the hide stripping operation to forcefully withdraw the hide grippers when attached to the hide, in the direction of the rear end of the chassis, or to the right in Figs. 3 and 4. This may be accomplished by means of chains 49—49a, or other forms of flexible pullers, secured to the hide grippers at 50, 50, Figs. 3, 4, and 8. In the embodiment illustrated, chains 49 are illustrated for this purpose.

The chains 49 extend along the sides and to the rear of the chassis, where they are trained over sprockets 51, 51 keyed or otherwise fixed upon the upright shafts 52, 52, which are suitably journalled for rotation in brackets 53 at the rear end of the chassis. These chains may hereinafter at times be referred to as the primary pullers. Referring to Figs. 7 and 8, chain or puller 49 will be seen to pass about a sprocket 54 on shaft 57, to present an end 55 anchored as at 56 to a stationary part of the chassis. In similar manner, chain or puller 49a passes about another sprocket on shaft 57, presenting an end 58 likewise fixed to the anchorage 56. The two sprockets mentioned are shown at 54 and 59 upon Fig. 3.

Spockets 54 and 59 are idlers upon the shaft 57, and are carried by a block 60 which by means of a chain or equivalent means 62, may be pulled in a direction away from the anchorage 56, or to the left in Figs. 3, 7, and 8. As is best illustrated by Fig. 3, the chain 62 passes over an idler sprocket 64 near the front end of the chassis, and then about a vertically shiftable sprocket 65 carried by a clevis 66 on the lower end of a piston rod or ram 67 associated with the hydraulic cylinder 34. The forward end 68 of chain 62 is anchored to a stationary part of the chassis, near the forward end thereof.

In view of the foregoing explanation, it will be understood that activation of ram 67 in a downward direction by the hydraulic cylinder 34, will lower the sprocket 65 and project the chain 62 to the broken line position 69, thereby causing the chain to move block 60 forwardly for tensioning the pullers 59, 59a, for retracting the hide grippers 35 from the initial forward position of Fig. 3. In the retracted or withdrawn position, the grippers will be disposed alongside the chassis near the rear end 28 thereof, at the extreme position.

Upon each shaft 52 is mounted a spiral spring 70 housed in a casing 71 and so arranged as to wind up the spring each time that chain 62 is moved by the hydraulic motor 34 to retract the grippers 35. The springs accordingly act to reverse the direction of shaft rotation when the ram retracts, thereby to keep taut the chain 62 while block 60 returns to the home position of Fig. 3. The spring action, of course, slackens the pullers 49 and 49a, making possible the return of grippers 35 to initial forward position, by the action of means described below, and illustrated at the head of Fig. 8.

Referring to Fig. 8, it is noted that shafts 52 have fixedly mounted near their upper ends the sprockets 73 and 74, which are in spaced parallelism with the lower pair of fixed sprockets 51—51. In the plane of sprockets 73 and 74, and at the forward ends of track members 36—36, are rotatably mounted a pair of idler sprockets 75 and 76. Trained over the sprockets 73 and 75 is an endless chain 77, to be driven by sprocket 73 and its shaft 52. A second chain 78 is similarly mounted upon sprockets 74 and 76, to be driven by the remaining shaft 52.

At a point such as 80 upon each of the chains 77 and 78, attachment is made to the carriages 37—37, so that movement of the chains in the directions indicated by the arrows upon Fig. 8 results in shifting the carriages from the initial extended position shown, to a retracted position closer to sprockets 73 and 74. Movement of the chains in the opposite direction, of course, returns the carriages to the fully extended position shown.

Since all of the sprockets 51, 51, 73 and 74 are fixed to their shafts 52 and 52, it is evident that movement of chain 62 (Fig. 8) to the left, by the action of hydraulic motor 34, causes shafts 52—52 to rotate in the directions indicated by the arrows, this resulting in rotating the sprockets 73 and 74 to retract the carriages 37—37. At the same time, the hide grippers 35—35 are correspondingly retracted by the chains or pullers 49 and 49a, while suspended from the carriages. The action described results in stripping the hide from a carcass abutting the stationary back rest.

Upon completion of the hide stripping operation, pressure of fluid to the hydraulic motor is reversed by the operator, permitting slackening of chain 62 and allowing the springs 70—70 to drive the shafts 52—52 in reverse direction, for returning the carriages 37—37 to the forward or extended position. In so returning to the forward or extended position, the carriages pull with them the grippers hanging from the suspenders 40, thereby taking up the slack in chains or pullers 49 and 49a. When the carriages and the grippers reach the initial forwardly extended position of Figs. 3, 4, 7 and 8, the apparatus is in condition for release of the hide and acceptance of another carcass.

As will be understood from Fig. 8, return of the grippers to forward or initial position by the action of spring motors 70—70, causes block 60 to move to the right, thereby taking up any slack in chain 62. The chains 77 and 78 may hereinafter be referred to as the secondary pullers, as contrasted with the primary pullers 49 and 49a. As was previously noted herein, these pullers as well as the chain 62, might be in the form of cables, ropes, or other flexible elements of similar character. It is to be noted also that the springs 70—70 might take forms other than that disclosed herein, to just as effectively drive the carriages to initial or extended position upon retraction of the ram 67.

Fig. 9 illustrates in diagrammatic form a suggested arrangement of electric switches and solenoids whereby the actions of the machine may be controlled. Switch 84 may be a momentary contact switch in series with a solenoid 85 across the leads 86 and 87, arranged to operate valve means (not shown) for contracting the hydraulic cylinder 25 to raise the excoriator bodily toward rail 20. A similar switch 88 and solenoid 89, when energized, serves to initiate reversal of fluid pressure in cylinder 25, to lower the excoriator.

Switch 90 and solenoid 91, when energized, initiate a flow of fluid pressure to the gripper cylinders 45—45, to place the jaws under operating pressure throughout the hide stripping operation. This may be a snap switch subject to manual closing and opening of the solenoid circuit.

Upon closing the switch 90 to pressurize the grippers, the next step in the operation is to actuate the primary pullers 49 and 49a to retract the grippers and strip the hide from the carcass. This step of the operation may be initiated by moving a switch lever 92 to a contact 93 for energizing a solenoid 94, which in turn positions certain valves (not shown), directing pressure of fluid to the top of cylinder 34 for effecting retraction of the grippers in a manner previously explained. Upon completion of the stripping operation performed by the grippers, switch lever 92 may be manually moved to engage a contact 95, closing the circuit through solenoids 96 and 97 to initiate reversal of fluid flow in cylinder 34 and relief of pressure upon the grippers, so that the grippers return to initial forward position as previously explained, with pressure on the jaws relieved. The machine is thereby restored to initial condition for release of the hide and carcass operated upon, and acceptance of a subsequent carcass.

In that form of the invention represented by Figs. 10, 11, and 12, the operation of the device is performed electrically rather than hydraulically. Here a reversing electric motor 100 driving a reduction gear 101 may rotate a sprocket 102 in forward or reverse directions, to lift and lower the chassis bodily by means of a chain 103 trained over the sprocket. The elevating and lowering movements may be guided by the telescopic members 23—24.

A second reversing electric motor 104 mounted upon the chassis may, through a suitable reduction gear 105, rotate a horizontal shaft 106 which carries spools or drums 107 upon which may be wound the pullers 49a and 49, in the form of chains or cables, to withdraw the hide grippers 35 to retracted position alongside the chassis. Atop the chassis may be mounted, and journalled for rotation, a countershaft 108 having a driving connection with shaft 106 through the agency of a chain 109 and suitable sprockets fixed to the shafts 106 and 108. Shaft 108 may carry a pair of fixed sprockets 110 over which are trained the endless chains 77 and 78, which have idler sprocket support at the forward ends of the track members 36. The idler sprockets 175 and 176 of the modified form of machine correspond to the idler sprockets 75 and 76 of the hydraulic machine, and the track members 36 may be identical in both instances. The carriages 37—37 have connection to the pullers or chains 77 and 78, so that upon rotation of the shafts 106 and 108, the carriages will be shifted in correspondency with movements of the grippers lengthwise of the machine.

In the Fig. 10 form of machine, the use of a reversable motor may eliminate the need for any spring motors to return the carriages to initial extended position; however, the principle of freely suspending the hide grippers from the carriages, and causing the carriages to return the gripper to initial extended position, is common to both machines. The carriage extensions 39 projecting forwardly over and beyond the back rest is important to both the hydraulic and the electric machine, as this feature combined with flexible suspension of the hide grippers presents decided advantages over known constructions.

It is to be understood that various modifications and changes in the structural details of the device may be resorted to, within the scope of the appended claims, without departing from the spirit of the invention.

What is claimed is:

1. In a device of the class described, the combination of a chassis having forward and rear ends, and a top portion, means associated with the top portion of the chassis for suspending the latter from an overhead rail, a pair of forwardly divergent stationary track members near the top portion of the chassis extending generally lengthwise thereof, and a pair of movable carriages each shiftable longitudinally upon one of the track members, a pair of hide grippers, and means swingingly suspending each hide gripper independently from one of the movable carriages whereby the grippers may have independent universal movement in all lateral directions relative to their respective supporting carriages, a pair of primary flexible pullers each having connection with one of the hide grippers, and power means moving the pullers substantially in unison to forcefully draw the grippers from an initial forward position toward the rear end of the chassis, secondary puller means to draw the gripper-supporting carriages from an initial forward position toward the rear end of the chassis, and means for selectively returning the carriages and the grippers to the initial forward position.

2. The device as set forth in claim 1, wherein is included in the combination, means for selectively altering the distance between the chassis and its supporting rail.

3. In a device of the class described, the combination of an elongate chassis having forward and rear ends, a pair of spaced track members mounted upon the chassis to extend generally lengthwise thereof, a pair of movable carriages each shiftable longitudinally upon one of the track members, a pair of hide grippers, and means swingingly suspending each hide gripper independently from one of the movable carriages whereby the grippers may have independent universal movement in all lateral directions relative to their respective supporting carriages, a pair of primary pullers each having connection with one of the hide grippers, and power means moving the pullers substantially in unison to forcefully draw the grippers from an initial forward position toward the rear end of the chassis, secondary puller means to draw the gripper-supporting carriages from an initial forward position toward the rear end of the chassis, and means for returning the carriages and grippers to the initial forward position.

4. The device as set forth in claim 3, wherein the primary pullers are flexible so as to offer minimal interference with the universal movements of the hide grippers.

5. The device as set forth in claim 3, wherein the combination includes power means for returning the carriages to initial position, the grippers being so returned by reason of the flexible connections with the carriages at the suspending means aforesaid.

6. In a device of the class described, the combination of an elongate chassis having forward and rear ends, and a top portion, means associated with the top portion of the chassis for suspending the latter from an overhead rail, a pair of spaced track members mounted at the top portion of the chassis to extend generally lengthwise thereof, a pair of movable carriages each shiftable longitudinally upon one of the track members, mechanism on the chassis including motor means for selectively shifting the carriages in unison from an initial forward position to a rearward position, and from the rearward position to the initial forward position, a pair of hide grippers each flexibly suspended from one of the carriages for independent universal movement in all lateral directions, and power means operative to shift the hide grippers in one direction only, lengthwise of the track members, leaving the grippers free to travel in the opposite direction under the pulling influence of the driven carriages.

7. The device as set forth in claim 6, wherein the power means last mentioned includes a flexible puller offering minimal interference with the gripper movement in said opposite direction.

8. In a device of the class described, the combination of an elongate chassis having forward and rear ends, and a back rest at the forward end of the chassis, a pair of spaced track members mounted upon the chassis to extend generally lengthwise thereof at equal distances from the back rest, a pair of movable carriages each shiftable longitudinally upon one of the track members, said carriages each including a forward extension to project beyond the forward ends of the track members, above and forwardly of the back rest, flexible suspender means secured to the extending portion of each carriage, a pair of hide grippers, means securing a hide gripper to each flexible suspender means, at an elevation approximating the elevation of the back rest power means connected with the carriages for shifting the latter unitarily in opposite directions along the track members, to effect corresponding shifting movements of the hide grippers through the medium of the flexible suspender means, and auxiliary power means for pulling the hide grippers toward the rear end of the chassis while the carriages travel in the same direction.

9. The device as set forth in claim 8, wherein the auxiliary power means includes a flexible puller connected to each gripper and adapted to be tensioned when the auxiliary power means is activated.

10. In a device of the class described, the combination of an elongate chassis having forward and rear ends, and a back rest at the forward end of the chassis, a pair of spaced track members mounted upon the chassis to extend generally lengthwise thereof at equal distances from the back rest, a pair of movable carriages each shiftable longitudinally upon one of the track members, said carriages each including a forward extension to project beyond the forward ends of the track members, above and forwardly of the back rest, flexible suspender means secured to the extending portion of each carriage and depending therefrom, a pair of hide grippers each secured to a flexible suspender means at an elevation approximating the elevation of the back rest, a pair of elongate flexible pullers each having opposite end portions, means securing corresponding end portions of the pullers each to a hide gripper, and power means connected to the remaining end portions of the pullers for moving the grippers from an initially extended position forwardly of the back rest, to a retracted position near the rear end of the chassis, means actuated by said power means for correspondingly moving the carriages and the suspender means depending therefrom, and spring means tensioned by movement of the grippers to the retracted position, for returning the carriages to the initially extended position aforesaid.

11. The device as set forth in claim 10, wherein retractile motion of the pullers for the grippers is transmitted directly to the carriages by means of a pair of rotatable upright shafts journalled at the rear end of the chassis, and an endless chain driven by each shaft, said chains each having a fixed connection to one of the carriages.

12. In a device of the class described, the combination of an elongate chassis having forward and rear ends, and a back rest at the forward end of the chassis, a pair of spaced track members mounted upon the chassis to extend generally lengthwise thereof at equal distances from and above the back rest, a pair of movable carriages each shiftable longitudinally upon one of the track members, said carriages each including a forward extension to project beyond the forward ends of the track members above and forwardly of the back rest, flexible suspender means secured to the extending portion of each carriage and depending therefrom, a pair of hide grippers each secured to the depending portion of a flexible suspender means at an elevation approximating the elevation of the back rest, a pair of upright shafts rotatably journalled upon the chassis near the rear end thereof, said shafts having upper and lower ends, and a sprocket fixed to each end of each shaft, a pair of hide gripper pull chains each having an end secured to a gripper, and each having an opposite end portion trained about one of the lower sprockets of the shafts, power means for pulling and tensioning the chains near said opposite end portions, for moving the grippers from the initially extended position toward the rear end of the chassis, while rotating the sprockets and the shafts aforesaid, a spring associated with each shaft tending to yieldingly rotate the shafts in the opposite direction, a pair of idler sprockets rotationally mounted upon the track members near the forward ends of the latter, a pair of endless chains each trained over one of the idler sprockets and one of the upper shaft sprockets, for transmitting rotational movements of the shafts to the idler sprockets, and means connecting one reach of each endless chain to a carriage, for shifting said carriages lengthwise of the track members.

13. The device as set forth in claim 12, wherein the combination includes a pump on the chassis and flexible hose means connected to each hide gripper, for actuating said grippers to selectively clamp and release the hide of an animal supported against the back rest.

14. The device as set forth in claim 12, wherein the combination includes means for bodily elevating and lowering the chassis relative to an overhead supporting rail.

References Cited in the file of this patent
UNITED STATES PATENTS 2,696,633   Hincks   Dec. 14, 1954

FOREIGN PATENTS 667,670   Germany   Dec. 6, 1938